(12) United States Patent
Matsumoto et al.

(10) Patent No.: US 7,674,418 B2
(45) Date of Patent: Mar. 9, 2010

(54) METHOD AND APPARATUS FOR FORMING A HOLLOW FRP ARTICLE BY INTERNAL PRESSURE MOLDING

(75) Inventors: Norio Matsumoto, Fukushima-ken (JP); Akiyasu Higuchi, Fukushima-ken (JP); Masaki Wakabayashi, Fukushima-ken (JP)

(73) Assignee: Fujikura Rubber Ltd., Tokyo (JP)

( * ) Notice: Subject to any disclaimer, the term of this patent is extended or adjusted under 35 U.S.C. 154(b) by 1194 days.

(21) Appl. No.: 10/811,023

(22) Filed: Mar. 26, 2004

(65) Prior Publication Data

US 2004/0188882 A1 Sep. 30, 2004

(30) Foreign Application Priority Data

Mar. 28, 2003 (JP) ............................. 2003-090471

(51) Int. Cl.
*B28B 21/48* (2006.01)
*B28B 7/32* (2006.01)
*B29C 35/00* (2006.01)

(52) U.S. Cl. ................ 264/314; 264/257; 264/516; 264/573; 425/389; 269/87

(58) Field of Classification Search ............... 264/512, 264/516, 102, 571, 257, 258, 313, 314, 317, 264/324, 573; 269/87; 425/389
See application file for complete search history.

(56) References Cited

U.S. PATENT DOCUMENTS

| | | | | |
|---|---|---|---|---|
| 3,893,318 A | * | 7/1975 | King et al. ................ 72/38 |
| 4,521,172 A | * | 6/1985 | Gilbert ..................... 425/73 |
| 4,780,262 A | * | 10/1988 | Von Volkli ............... 264/512 |
| 5,013,514 A | * | 5/1991 | Azzani et al. ............ 264/512 |
| 5,137,071 A | * | 8/1992 | Ashton et al. ............ 156/382 |
| 5,571,357 A | * | 11/1996 | Darrieux et al. .......... 156/173 |
| 5,840,347 A | * | 11/1998 | Muramatsu et al. ...... 425/393 |
| 5,985,197 A | * | 11/1999 | Nelson et al. ............ 264/221 |
| 6,071,460 A | * | 6/2000 | Renaudin et al. ........ 264/314 |
| 6,143,236 A | * | 11/2000 | Nelson et al. ............ 264/552 |
| 6,299,810 B1 | * | 10/2001 | Blackinton, Jr. ......... 264/102 |
| 6,352,662 B1 | * | 3/2002 | Murphy et al. ........... 264/129 |
| 6,692,681 B1 | * | 2/2004 | Lunde ..................... 264/510 |

\* cited by examiner

*Primary Examiner*—Matthew J. Daniels
(74) *Attorney, Agent, or Firm*—McCormick, Paulding & Huber LLP

(57) ABSTRACT

A method for forming a hollow FRP article by internal pressure molding includes positioning a FRP prepreg on a periphery of an airtight internal-pressure holding tube, inserting a composite body including the internal-pressure holding tube and the prepreg into a vacuum chamber containing a forming die, evacuating the vacuum chamber in an isolation state where the composite body and the forming die do not contact each other, and clamping the forming die to bring the forming die and the composite body into contact with each other and heating the forming die with an application of pressure to an inside of the internal-pressure holding tube after completion of the evacuating step.

5 Claims, 11 Drawing Sheets

METHOD AND APPARATUS FOR FORMING A HOLLOW FRP ARTICLE BY INTERNAL PRESSURE MOLDING

CROSS REFERENCE TO RELATED APPLICATION

The present application is related to and claims priority from the following co-pending application, namely, Japanese patent application number 2003-90471 filed on Mar. 28, 2003. The above-identified application is incorporated herein by reference in its entirety.

BACKGROUND OF THE INVENTION

1. Field of the Invention

The present invention relates to a method and an apparatus for forming a hollow FRP (fiber reinforced plastic) article such as a golf club shaft, a ski pole, a fishing rod or a hockey stick by internal pressure molding.

2. Description of the Related Art

Internal pressure molding (IPM) is often adapted for forming a shaft such as a golf club shaft. In the molding process, a mandrel is covered with an internal-pressure holding tube (bladder), a prepreg made of a sheet FRP is put on the mandrel covered with the internal-pressure holding tube, the composite body that is composed of the mandrel, the bladder and the prepreg is set in a shaft forming die, and the shaft forming die is heated while the prepreg and the shaft forming die are brought into intimate contact with each other by applying pressure to the inside of the internal-pressure holding tube to increase the internal pressure thereof. The mandrel is either used as an air passage during the heating of the shaft forming die, or removed after the aforementioned composite body is completed so that an air-injecting mouth piece, which is provided independently of the mandrel, can be fixed to an open end of the internal-pressure holding tube.

However, in the above-described internal pressure molding process, the air exiting a space between the shaft forming die and the prepreg prevents the shaft forming die and the prepreg from being in intimate contact with each other. This makes it impossible to obtain a satisfactory surface irregularity (surface roughness) of the prepreg. To prevent this problem from occurring, the assignee of the present invention has applied a vacuum forming method (which is a known forming method in which the air in a forming die is evacuated to a degree of vacuum), which is often used as a vulcanization forming for rubber material, in an internal pressure molding process. Nevertheless, it has still proved difficult to achieve a satisfactory surface irregularity.

SUMMARY OF THE INVENTION

The present invention provides a method and an apparatus for forming a hollow FRP article (such as a golf club shaft) with a satisfactory surface irregularity by applying a vacuum forming method in an internal pressure molding process.

As a result of investigating the cause of the inability of achieving a satisfactory surface irregularity even if a vacuum forming method is applied in the internal pressure molding process, it was established that air remains in the space between the forming die and the prepreg even if the forming die is evacuated with the prepreg-composite body being set in the forming die, and that the remaining air causes deterioration in the surface irregularity, e.g., causes pits and dimples on a surface of the molded hollow article. The present invention has been devised in view of this problem, based on the finding that the surface irregularity is drastically improved if the forming die is evacuated with the forming die and the prepreg does not contact the forming die (i.e., with the prepreg-composite body floating in the forming die).

According to an aspect of the present invention, a method for forming a hollow FRP article by internal pressure molding is provided, including positioning a FRP prepreg on a periphery of an airtight internal-pressure holding tube, inserting a composite body including the internal-pressure holding tube and the prepreg into a vacuum chamber containing a forming die, evacuating the vacuum chamber in an isolation state where the composite body and the forming die do not contact each other, and clamping the forming die to bring the forming die and the composite body into contact with each other and heating the forming die with an application of pressure to an inside of the internal-pressure holding tube after completion of the evacuating step.

It is desirable for the prepreg positioning step to include covering a mandrel with the internal-pressure holding tube, and wrapping the FRP prepreg around the periphery of the internal-pressure holding tube.

It is desirable for the clamping and heating step to include applying pressure to the inside of the internal-pressure holding tube through air passages formed on the mandrel.

It is desirable for the prepreg positioning step to include covering a mandrel with the internal-pressure holding tube, wrapping the FRP prepreg around the periphery of the internal-pressure holding tube, and removing the mandrel after the wrapping step.

It is desirable for the clamping and heating step to include applying pressure to the inside of the internal-pressure holding tube through an air-injecting mouth piece fixed to an open end of the internal-pressure holding tube after the mandrel is removed.

In another embodiment, an apparatus for forming a hollow FRP article by internal pressure molding is provided, including a vacuum chamber, a forming die positioned in the vacuum chamber, a vacuum-chamber opening/closing mechanism for opening and closing the vacuum chamber, a composite-body support device for supporting a composite body without making the composite body come into contact with the forming die in a state where the forming die is opened by the vacuum-chamber opening/closing mechanism, the composite body including an airtight internal-pressure holding tube and a prepreg fitted on the airtight internal-pressure holding tube, an evacuation system for evacuating the vacuum chamber, an internal-pressure supplying device for applying pressure to an inside of the internal-pressure holding tube of the composite body which is supported by the composite-body support device, and a controller for actuating the vacuum-chamber opening/closing mechanism to clamp the forming die to thereby bring the forming die and the composite body into intimate contact with each other, and for heating the forming die with an application of pressure to the inside of the internal-pressure holding tube after the vacuum chamber is evacuated by the evacuation system.

The composite body can be obtained by covering a mandrel with the internal-pressure holding tube and wrapping the FRP prepreg around a periphery of the internal-pressure holding tube.

The mandrel include an axial air passage and at least one radial air passage, and the internal-pressure supplying device can include an intermediate movable nozzle which is removably inserted into the axial air passage and includes a one-way valve for preventing air from flowing into the vacuum chamber, a forced valve-opening nozzle which is removably inserted into the forced valve-opening nozzle, the one-way valve being opened by an insertion of the forced valve-opening nozzle into the intermediate movable nozzle, and an internal-pressure supplying source for supplying compressed air to the forced valve-opening nozzle.

The composite body can be obtained by covering a mandrel with the internal-pressure holding tube, wrapping the FRP prepreg around a periphery of the internal-pressure holding tube, and thereafter removing the mandrel from the composite body.

The mandrel can include an axial air passage and at least one radial air passage, and the internal-pressure supplying device can include an intermediate movable nozzle which is removably inserted into the axial air passage after the removal of the mandrel from the composite body, and includes a one-way valve for preventing air from flowing into the vacuum chamber; a forced valve-opening nozzle which is removably inserted into the forced valve-opening nozzle, the one-way valve being opened by an insertion of the forced valve-opening nozzle into the intermediate movable nozzle; and an internal-pressure supplying source for supplying compressed air to the forced valve-opening nozzle.

It is desirable for the composite-body support device to include a cantilever support base for supporting the composite body in a cantilever fashion.

It is desirable for the composite-body support device to be mounted to a lower-die table which supports a lower die of the forming die thereon. At least a part of the composite-body support device is biased upwards, toward an upward moving limit thereof, by a biasing device so that the composite body, which is supported by the composite-body support device, does not contact the lower die.

The forming die and the composite body can be designed for manufacturing a golf club shaft.

The composite body can be obtained by covering a mandrel with the internal-pressure holding tube and wrapping the FRP prepreg around a periphery of the internal-pressure holding tube. The cantilever support base includes an inner support portion and an outer support portion which are positioned apart from each other in an axial direction of the composite body. It is desirable for the inner support portion to include a half-cylindrical recess having a radius corresponding to a half of an outer diameter of a large-diameter end of the mandrel, a portion of the mandrel in a vicinity of the large-diameter end being positioned in the half-cylindrical recess. It is desirable for the outer support portion to include a cantilever through hole which is greater in diameter than the large-diameter end of the mandrel so that only an upper edge of the outer support portion in the cantilever through hole comes in contact with the large-diameter end of the mandrel from above.

It is desirable for the composite-body support device to further include an anti-deflection support base, positioned inside the vacuum chamber, for subsidiarily supporting a small-diameter end of the composite body to prevent the small-diameter end from developing deflections.

It is desirable for the lower-die table to be guided in a vertical direction to be movable vertically with respect to an upper die fixed to an inner surface of the vacuum chamber.

The present disclosure relates to subject matter contained in Japanese Patent Application No.2003-090471 (filed on Mar. 28, 2003) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
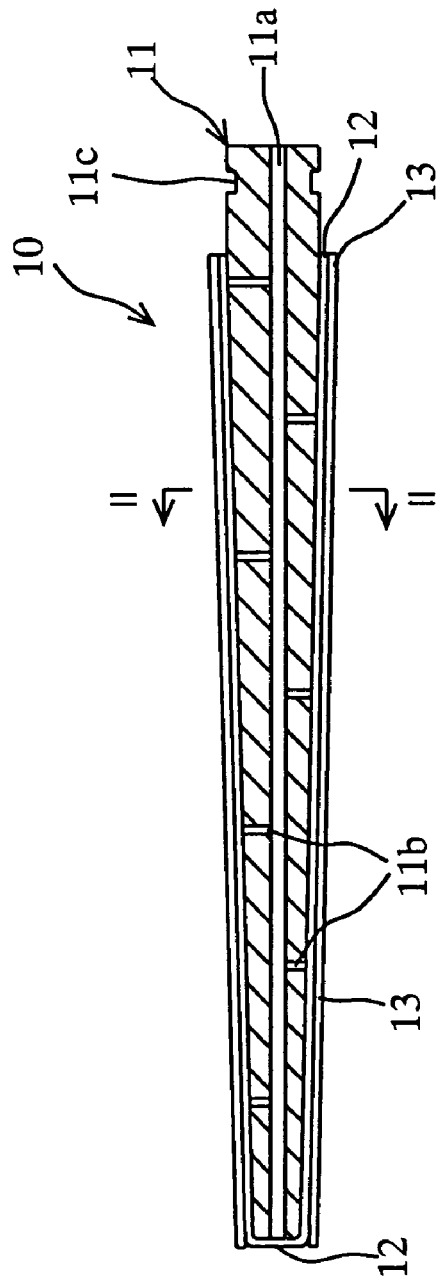
FIG. 1 is a schematic axial cross sectional view of a composite body which is made by wrapping a prepreg around a mandrel covered with an internal-pressure holding tube.
Figure 2:
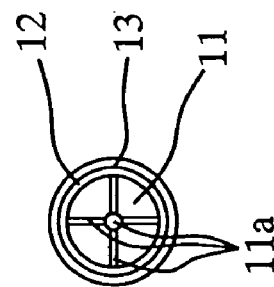
FIG. 2 is a cross sectional view taken along II-II line shown in FIG. 1.

FIGS. 1 and 2 show conceptual diagrams of an embodiment of a composite body 10 which is constructed by covering a mandrel 11 in the shape of a tapered rod with an internal-pressure holding tube (bladder) 12 made of a airtight rubber or plastic film, and subsequently positioning a prepreg 13 made of a synthetic resin sheet around the periphery of the internal-pressure holding tube 12. The shape of the mandrel 11 is simplified, and the diameter and the taper angle of the mandrel 11 are exaggerated in the drawings. The mandrel 11 is provided in an axial center thereof with an axial air passage (axial through hole) 11a, and is provided with a plurality of radial air passages (radial through holes) 11b which extend radially outwards from the axial air passage 11a. The mandrel 11 is provided in the vicinity of a large-diameter end (butt end) thereof (the right end as viewed in FIG. 1) with an axial-movement prevention groove (circumferential annular groove) 11c. The internal-pressure holding tube 12 is in the shape of a long fingerstall, one end of which is formed as an open end, and is closely fitted on the periphery of the mandrel 11. The prepreg 13 can be made to bulge by increasing the internal pressure of the internal-pressure holding tube 12 by injecting compressed air into the axial air passage 11a of the mandrel 11. If necessary, the open end of the internal-pressure holding tube 12 can be prevented from bulging excessively by fitting a ring member on the open end of the internal-pressure holding tube 12 or by holding the open end with a portion of a forming die. The prepreg 13 can be an FRP material which can be formed to have a strength enabling the prepreg 13 to be used as a golf club shaft by heating the FRP material to a predetermined temperature. Accordingly, the FRP material for the prepreg 13 does not have to be of a specific type, and the ply number (number of wirings) of the material is optional. Note that the expression "to position a prepreg" is intended to be used to express all the cases of positioning the prepreg on the periphery of an internal-pressure holding tube such as a case of wrapping the prepreg around the periphery of an internal-pressure holding tube or a case of attaching the prepreg to the periphery of an internal-pressure holding tube in the specification and the claim of the present invention.

Figure 3:
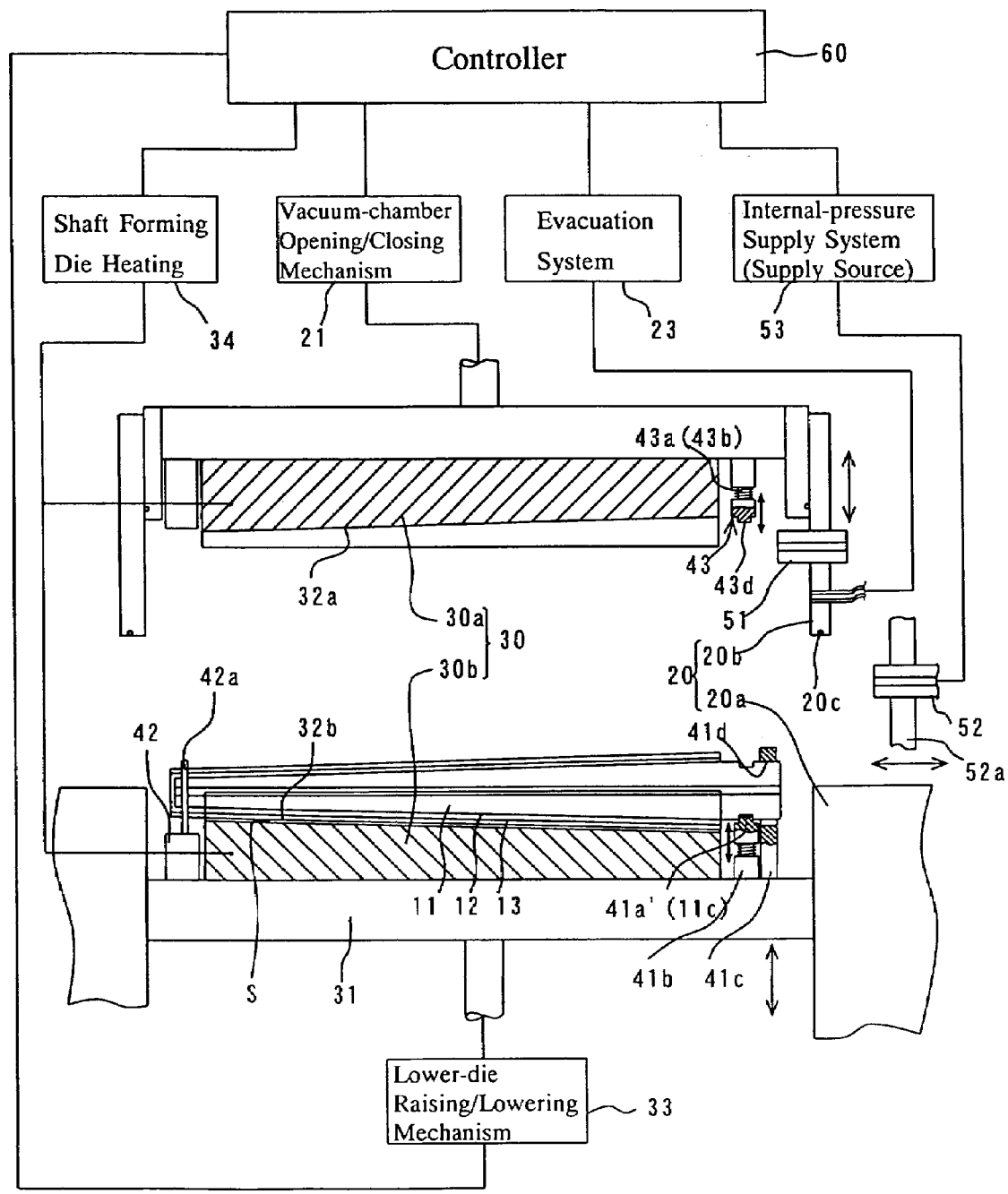
FIG. 3 is a schematic system diagram including a cross sectional view of an embodiment of an apparatus for forming a hollow FRP article by internal pressure molding.
Figure 4:
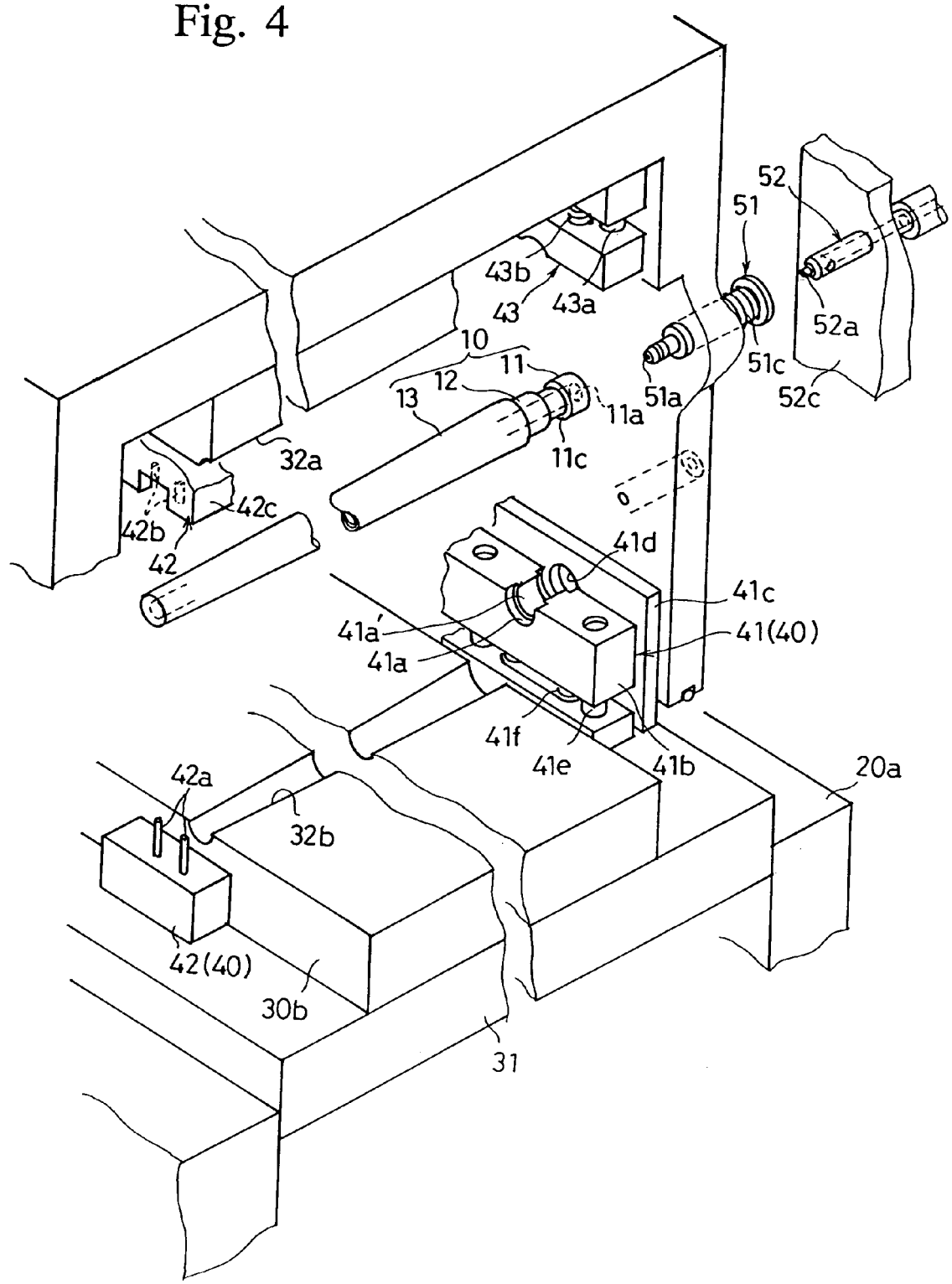
FIG. 4 is a perspective view of the apparatus shown in FIG. 3.

FIGS. 3 and 4 show the overall structure of an embodiment of the apparatus for forming a hollow FRP article by internal pressure molding. This internal pressure forming apparatus is provided with a vacuum chamber 20 which is composed of a stationary base 20a and a movable case 20b. The movable case 20b can move toward and away from the stationary base 20a via a vacuum-chamber opening/closing mechanism 21. In a vacuum-chamber closed state where the movable case 20b is in intimate contact with the stationary base 20a, a vacuum (negative pressure) can be produced in the vacuum chamber 20 by evacuating the vacuum chamber 20 by an evacuation system 23. A sealing member 20c is fixed to a portion of the movable case 20b which is brought into contact with the stationary base 20a.

The internal pressure forming apparatus is provided in the vacuum chamber 20 with a shaft forming die 30. The shaft forming die 30 consists of an upper die 30a and a lower die 30b. The upper die 30a is fixed to an inner surface of a top wall of the movable case 20b, while the lower die 30b is fixed on top of a lower-die platform (table) 31 which is supported to be capable of moving up and down with respect to the stationary base 20a while maintaining the airtightness between the lower-die platform 31 and the stationary base 20a. The upper die 30a and the lower die 30b are provided on opposed surfaces thereof with a pair of shaping recesses 32a and 32b, respectively, for accommodating and pressing the composite body 10 therebetween to shape the composite body 10 in a certain desired form. It is desirable that the upper die 30a and the lower die 30b be provided, at respective ends of the pair of shaping recesses 32a and 32b in the vicinity of large-diameter ends thereof (the right ends as viewed in FIG. 3), with upper and lower semicircular circumferential grooves (or flanges) for clamping the periphery of a large-diameter end (the right end as viewed in FIG. 1) of the internal-pressure holding tube 12, respectively, while the mandrel 11 is provided with an annular flange (or groove) which can be engaged with the upper and lower semicircular circumferential grooves (or flanges). The lower-die platform 31, which carries the lower die 30b, is driven to ascend and descend by a lower-die raising/lowering mechanism 33 to move toward and away from the upper die 30a (the movable case 20b). Accordingly, in the illustrated embodiment of the internal pressure forming apparatus, the lower-die raising/lowering mechanism 33 and the vacuum-chamber opening/closing mechanism 21 constitute an opening/closing mechanism for opening and closing the shaft forming die 30.

The lower-die platform 31 is provided on top thereof with a mandrel support device (composite-body support device) 40 consisting of a cantilever support base 41 and an anti-deflection support base 42. The cantilever support base 41 supports the large-diameter end of the mandrel 11 in a manner to cantilever the composite body 10. The anti-deflection support base 42 subsidiarily supports a small-diameter end (tip end) of the composite body 10 to prevent the small-diameter end thereof from developing deflections. The cantilever support base 41 is provided with a front support portion (inner support portion) 41b and a rear support portion (outer support portion) 41c positioned to be closer to the large-diameter end of the mandrel 11 than the front support portion 41b. The front support portion 41b is provided thereon with a half-cylindrical recess 41a having a radius corresponding to a half of an outer diameter of the large-diameter end of the mandrel 11. The front support portion 41b is provided on an inner surface of the half-cylindrical recess 41a with a half-cylindrical engaging projection 41a' which corresponds to the axial-movement prevention groove 11c to be engageable therein. The rear support portion 41c is provided adjacent to the half-cylindrical recess 41a with a cantilever through hole 41d which is greater in diameter than the large-diameter end of the mandrel 11 so that only an upper edge of the rear support portion 41c in the cantilever through hole 41d comes in contact with the large-diameter end of the mandrel 11 from above.

Figure 11:
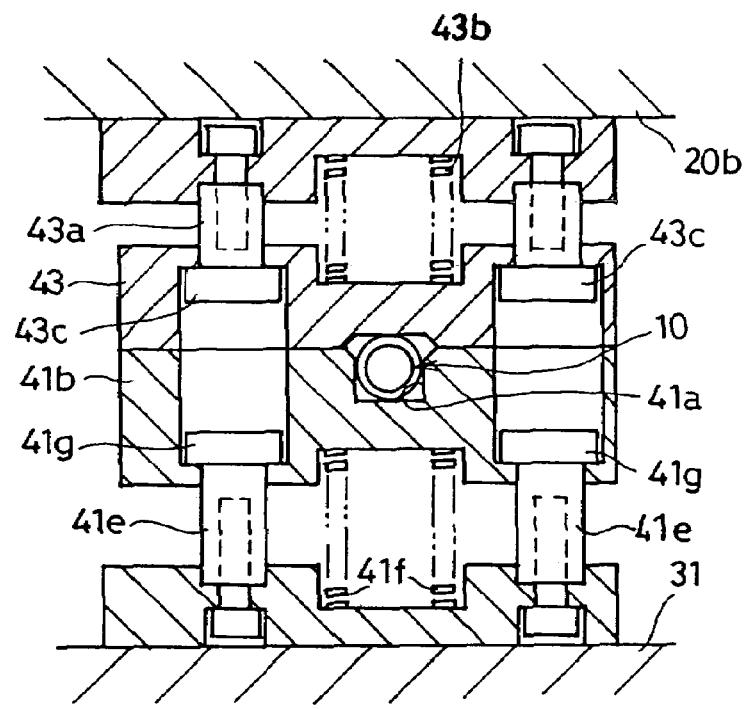
FIG. 11 is a cross sectional view taken along XI-XI line shown in FIG. 7.

The front support portion 41b is guided in a die-closing direction of the shaft forming die 30 (vertical direction as viewed in FIG. 3) by a pair of guide shafts 41e, and is continuously biased upwards by two compression coil springs 41f (see FIG. 11). The upper moving limit of the front support portion 41b with respect to the lower-die platform 31 is determined by a pair of stops 41g fixed to upper ends of the pair of guide shafts 41e, respectively (see FIG. 11).

Figure 12:
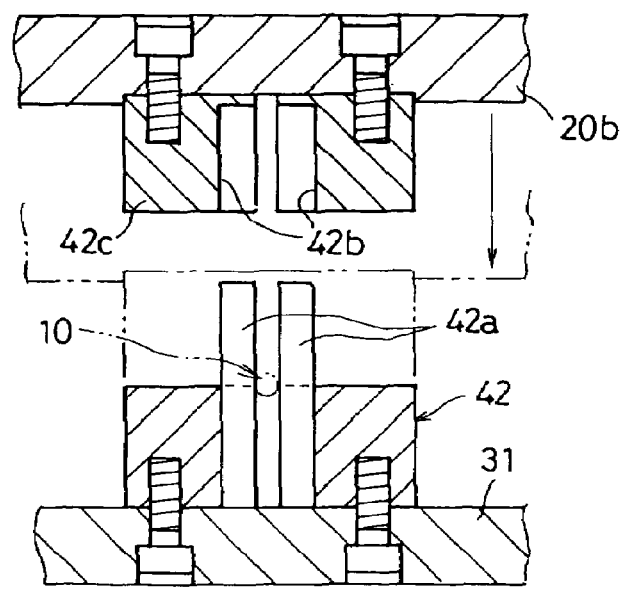
FIG. 12 is a cross sectional view taken along XII-XII line shown in FIG. 7.

The anti-deflection support base 42 is provided with a pair of vertical pins 42a between which the tip end (the left end as viewed in FIG. 1) of the composite body 10 is inserted. The pair of vertical pins 42a prevents the tip end of the composite body 10 from moving horizontally (in the horizontal direction as viewed in FIG. 12). The movable case 20b is provided on an inner surface thereof with an upper anti-deflection member 42c which is fixed to the movable case 20b to correspond to the anti-deflection support base 42. The upper anti-deflection member 42c is provided with a pair of clearance holes 42b in which the pair of vertical pins 42a are respectively inserted when the movable case 20b is driven to move down (see FIG. 12).

According to the mandrel support device 40 described above, if the large-diameter end of the composite body 10 (the mandrel 11) is inserted into the cantilever through hole 41d of the rear support portion 41c and subsequently the engaging projection 41a' is engaged in the axial-movement prevention groove 11c, the composite body 10 is cantilevered by the cantilever support base 41 to be supported thereby (i.e., in a manner so that the tip end of the composite body 10 stays in the air as a free end) while the tip end of the composite body 10 is prevented from moving horizontally with the tip end of the composite body 10 being positioned between the pair of vertical pins 42a of the anti-deflection support base 42. In this state, if no external force is applied to the front support portion 41b, the front support portion 41b is positioned in a raised position thereof by the two compression coil springs 41f while the composite body 10 (the prepreg 13 thereof) is held in a position thereof at which the composite body 10 is not in contact with the lower die 30b (specifically, with the inner surface of the shaping recess 32b).

On the other hand, the movable case 20b is provided with an upper holding block 43 which is fixed to an inner surface of the movable case 20b to correspond to the front support portion 41b of the cantilever support base 41. The upper holding block 43 serves as a holding device for holding the large-diameter end of the composite body 10 between the upper holding block 43 and the front support portion 41b of the cantilever support base 41. The upper holding block 43 is guided in the die-closing direction of the shaft forming die 30 by a pair of guide shafts 43a, and is continuously biased downwards by two compression coil springs 43b which have a spring force greater than the two compression coil springs 41f. The lower moving limit of the upper holding block 43 with respect to the movable case 20b is determined by a pair of stops 43c fixed to lower ends of the pair of guide shafts 43a, respectively (see FIG. 11). The upper holding block 43 is provided with a half-cylindrical engaging projection 43d which corresponds to the axial-movement prevention groove 11c which is engageable therein. The engaging projection 43d together with the engaging projection 41a' is engaged in the axial-movement prevention groove 11c to prevent the mandrel 11 (the composite body 10) from moving in the axial direction thereof when the lower-die platform 31 is raised while the movable case 20b is lowered.

Figure 9:
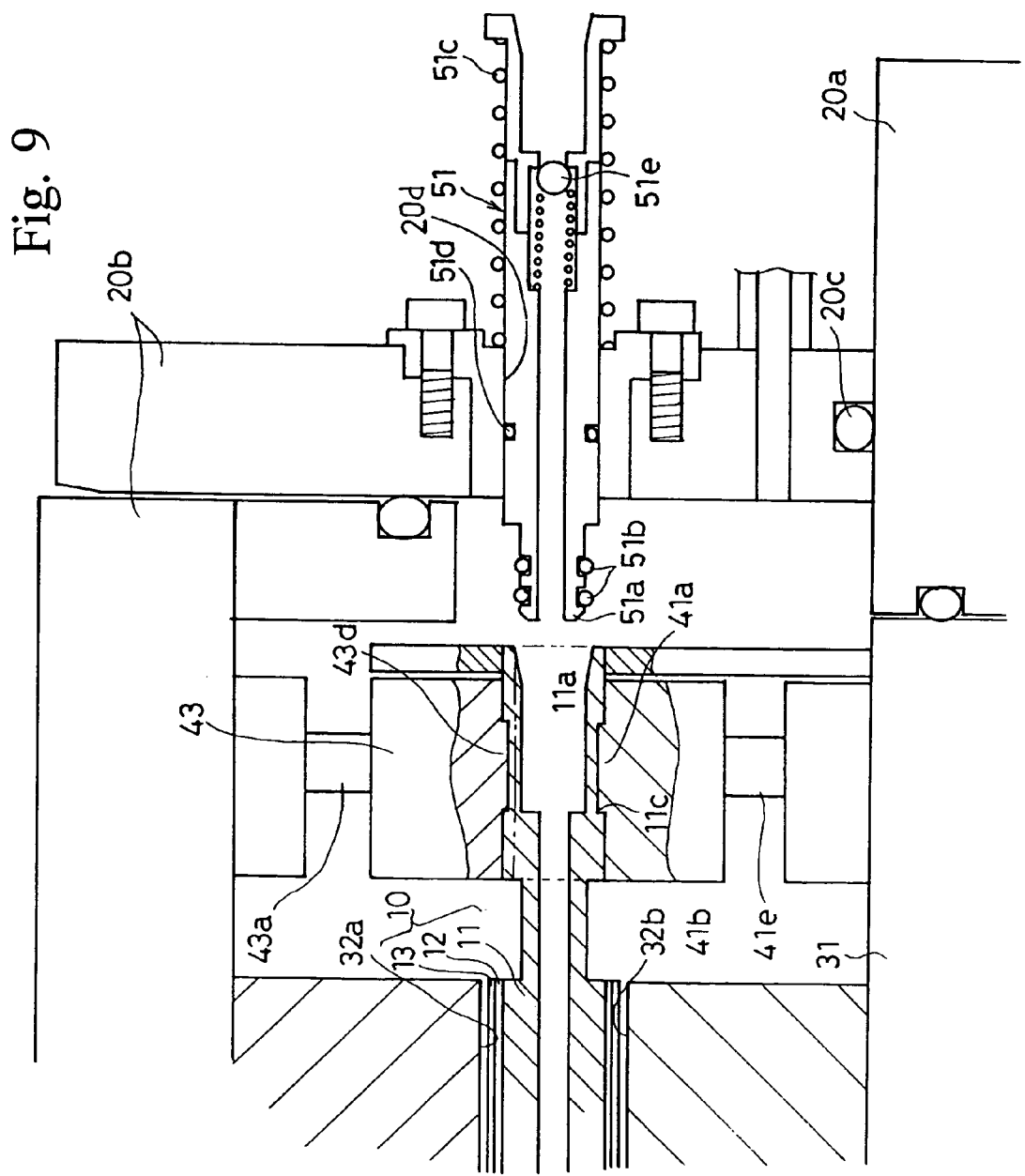
FIG. 9 is a cross sectional view of a portion of an embodiment of an internal pressure supply system for supplying compressed air into the mandrel of the composite body, in a state where pressure is not yet applied to the inside of the internal-pressure holding tube.
Figure 10:
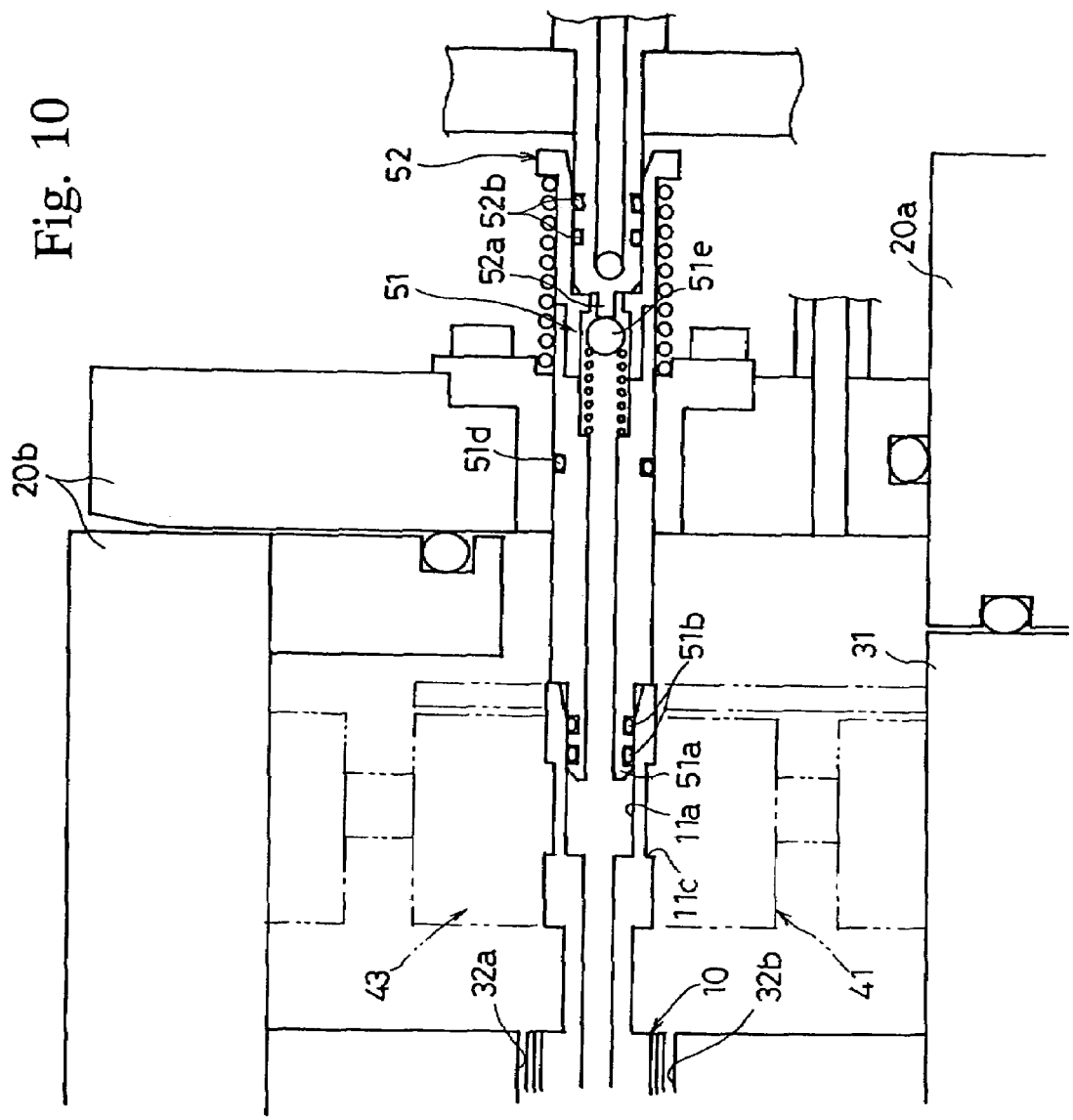
FIG. 10 is a view similar to that of FIG. 9, showing the portion of the internal pressure supply system in a state where pressure is being applied to the inside of the internal-pressure holding tube.

A mechanism for injecting compressed air into the mandrel 11 of the composite body 10 in a state where the shaft forming die 30 is closed after the vacuum chamber 20 is evacuated by the evacuation system 23 will be hereinafter discussed with reference chiefly to FIGS. 9 and 10. The movable case 20b is provided with an intermediate movable nozzle (pipe) 51 whose opposite ends extend inside and outside the movable case 20b and which is guided along the axis of the intermediate movable nozzle 51 in an airtight fashion in a direction parallel to the axis of the pair of shaping recesses 32a and 32b (i.e., the axis of the composite body 10). The intermediate movable nozzle 51 is provided at an inner end thereof with an insertion portion 51a which is fitted into the axial air passage 11a of the mandrel 11, and two O-rings 51b are fitted on the insertion portion 51a with a predetermined gap therebetween in the axial direction of the intermediate movable nozzle 51. A compression coil spring 51c for biasing the intermediate movable nozzle 51 in a direction to make the intermediate movable nozzle 51 project outwards from the movable case 20b (in a direction to make the intermediate movable nozzle 51 disengaged from the mandrel 11) is fitted on the portion of the intermediate movable nozzle 51 which is positioned outside the movable case 20b. An O-ring 51d is fitted on the portion of the intermediate movable nozzle 51 which slides on an inner peripheral surface of the movable case 20b in a thrust bearing hole (through hole) 20d formed in the movable case 20b.

The intermediate movable nozzle 51 is provided therein with a check valve (one-way valve) 51e. The check valve 51e does not open by the level of a negative pressure which is produced inside the vacuum chamber 20 (so that no air flowing into the vacuum chamber 20 is produced). The check valve 51e opens only when a forced valve-opening nozzle 52 is inserted into the intermediate movable nozzle 51 from the outside open end thereof by an amount so that a pressing portion 52a fixed at the tip end of the forced valve-opening nozzle 52 presses the check valve 51e inwards, toward the insertion portion 51a. The forced valve-opening nozzle 52 is connected to an internal-pressure supply system (supply source) 53 (see FIG. 3), and is fixed to a movable plate 52c which is movable in the axial direction of the intermediate movable nozzle 51. The two O-rings 52b maintain airtightness between the intermediate movable nozzle 51 and the forced valve-opening nozzle 52 when the forced valve-opening nozzle 52 is inserted into the intermediate movable nozzle 51. The internal-pressure supply system 53, the forced valve-opening nozzle 52, and the intermediate movable nozzle 51 constitute an internal-pressure supplying device.

The intermediate movable nozzle 51 and the forced valve-opening nozzle 52 are positioned so that the axes thereof are aligned when the movable case 20b is closed. The axes of the intermediate movable nozzle 51 and the composite body 10 are aligned when the shaft forming die 30 is clamped after the movable case 20b is closed. Although one shaping recess 32a and one shaping recess 32b are illustrated on the upper die 30a and the lower die 30b in the drawings, respectively, a series of shaping recesses each corresponding to the shaping recess 32a and a corresponding series of shaping recesses each corresponding to the shaping recess 32b are actually formed on the upper die 30a and the lower die 30b, respectively, and also a plurality of cantilever support bases each corresponding to the cantilever support base 41, a plurality of anti-deflection support bases each corresponding to the anti-deflection support base 42 and a plurality of upper holding block each corresponding to the upper holding block 43 are provided accordingly.

The vacuum-chamber opening/closing mechanism 21, the evacuation system 23, the lower-die raising/lowering mechanism 33, the internal-pressure supply system 53 and a shaft forming die heating system 34 are connected to a controller 60 (see FIG. 3). The controller 60 controls operations of these systems/mechanisms connected thereto.

An embodiment of a shaft forming process performed by the present embodiment of the internal pressure forming apparatus will be hereinafter discussed.

Firstly, the composite body 10 shown in FIGS. 1 and 2, which is formed by covering the mandrel 11 with the internal-pressure holding tube 12, and subsequently wrapping the prepreg 13 around this mandrel 11 covered with the internal-pressure holding tube 12, is prepared.

Figures 5A, 5B:
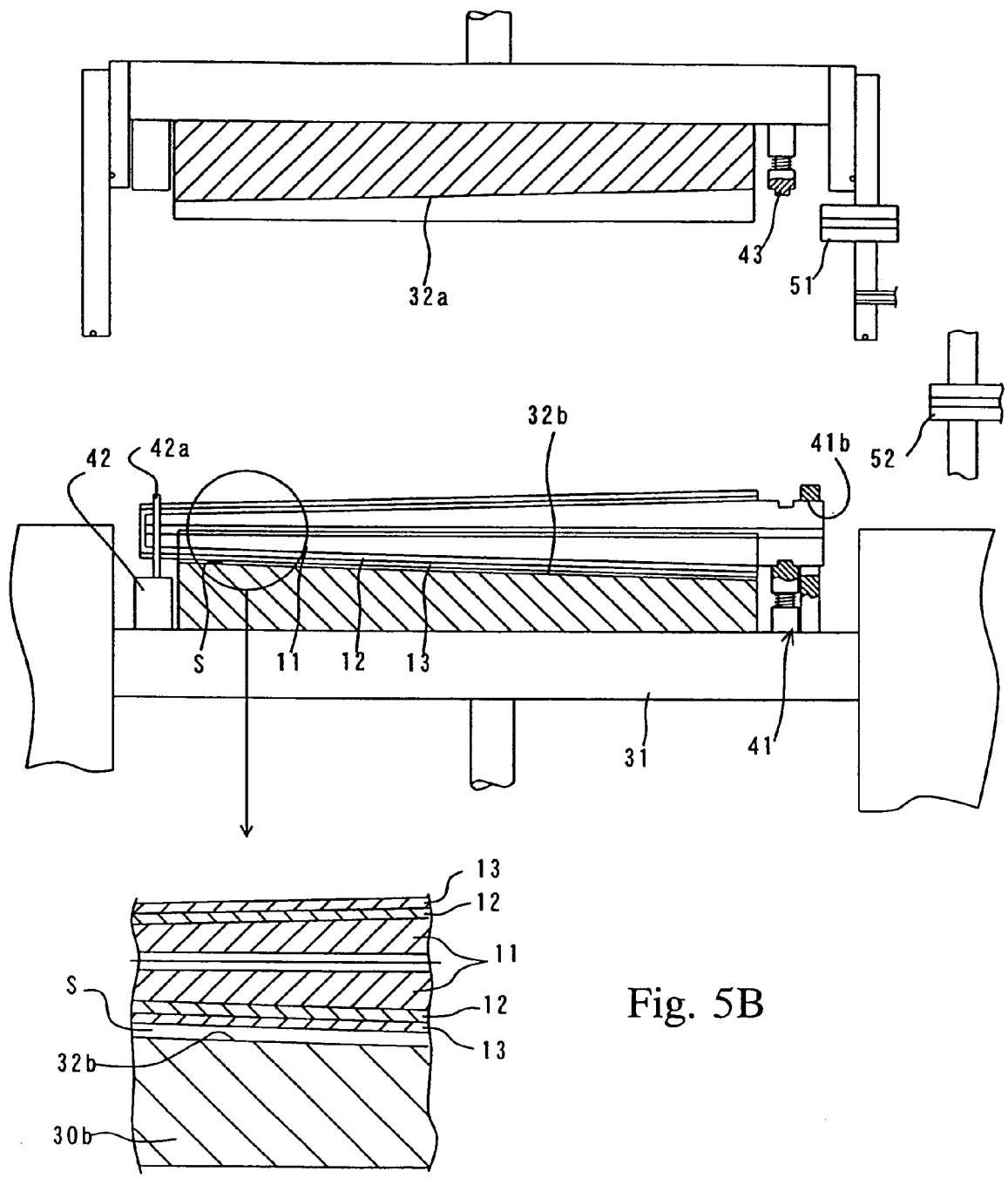
FIG. 5A is a cross sectional view of the apparatus shown in FIG. 3, showing a forming process with the apparatus.
FIG. 5B is a cross sectional view of a portion of the apparatus shown in FIG. 5A.

Subsequently, the composite body 10 thus prepared is set to the mandrel support device 40 to be supported thereby in a state where the movable case 20b has been raised by the vacuum-chamber opening/closing mechanism 21 while the lower-die platform 31 (the lower die 30b) has been lowered by the lower-die raising/lowering mechanism 33 as shown in FIGS. 5A and 5B. Namely, the large-diameter end of the composite body 10 (the mandrel 11) is inserted into the cantilever through hole 41d of the rear support portion 41c, the engaging projection 41a' is engaged in the axial-movement prevention groove 11c, and the tip end of the composite body 10 is positioned between the pair of vertical pins 42a of the anti-deflection support base 42. In this state, the composite body 10 (the prepreg 13) is positioned immediately above the shaping recess 32b of the lower die 32 without contacting with an inner surface of the lower die 30b in the shaping recess 32b. The amount of isolation of the composite body 10 from an inner surface of the shaping recess 32b of the lower die 30b is determined so that the composite body 10 does not come into contact with the inner surface of the shaping recess 32b in an evacuating operation using the evacuation system 23 with consideration of the deformation (deviation) of the prepreg 13 which is not yet heated. Specifically, a few millimeters is sufficient for the amount of isolation of the composite body 10.

Figure 6:
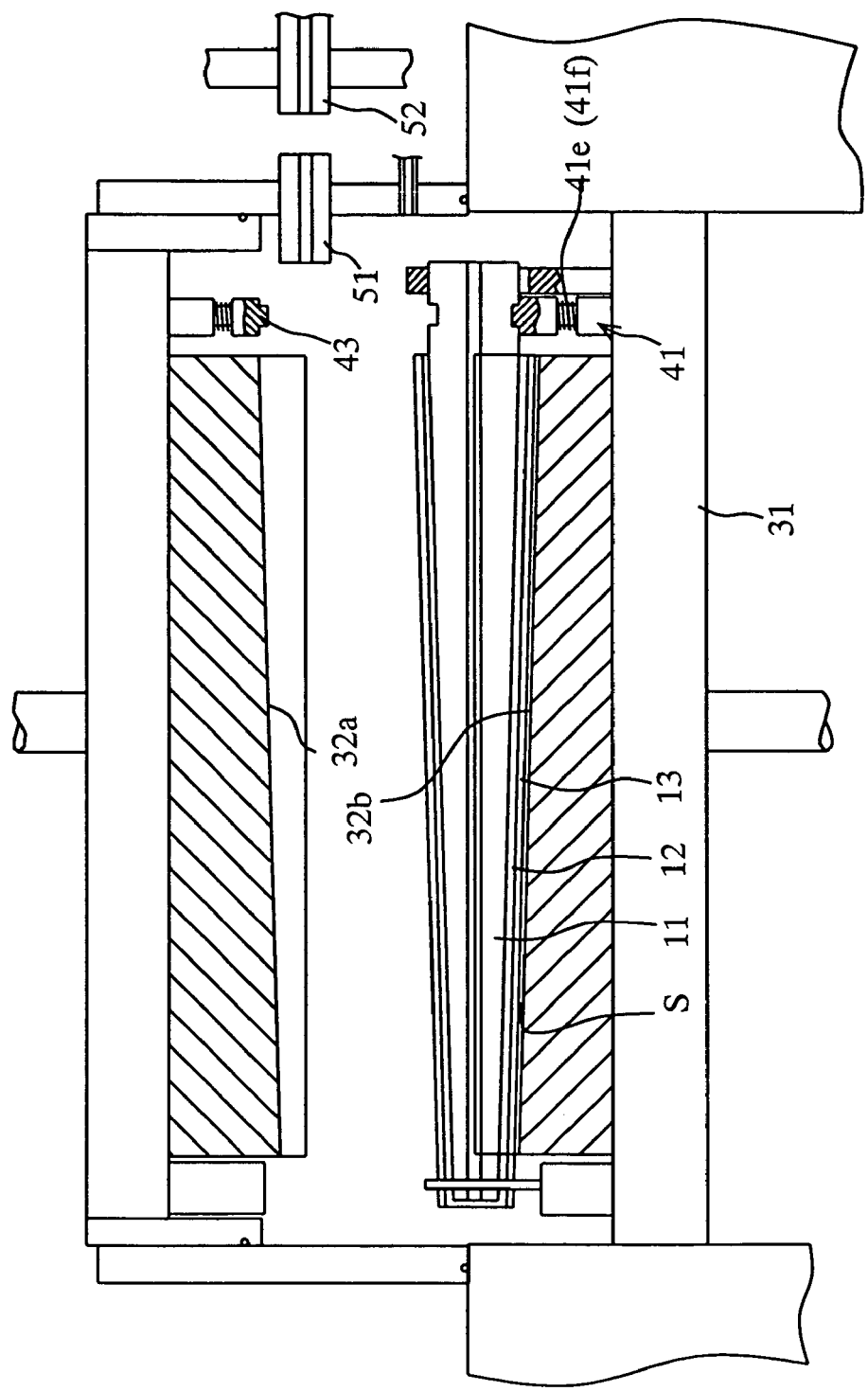
FIG. 6 is a view similar to that of FIG. 5A, showing another forming process different from the forming process shown in FIGS. 3 and 5A.

Subsequently, the movable case 20b is lowered by the vacuum-chamber opening/closing mechanism 21 to form the vacuum chamber 20 between the stationary base 20a and the movable case 20b, and the vacuum chamber 20 thus formed is evacuated by the evacuation system 23 (see FIG. 6). After completion of this evacuation, the composite body 10 (the prepreg 13) and the inner surface of the shaping recess 32b do not contact each other by an amount S, as shown in FIG. 5B.

In the evacuating operation using the evacuation system 23, it is desirable that the air which exits between the prepreg 13 of the composite body 10 and the internal-pressure holding tube 12 be vacuumed so as to be removed therefrom; moreover, it is desirable that the air in the prepreg 13 be also vacuumed so as to be removed therefrom. Removing this air reliably prevents the air from being trapped on a surface of the prepreg 13 and thereby deteriorating the surface irregularity (surface roughness) of the prepreg 13. To this end, it is desirable that enough time be provided for the evacuating operation or that the composite body 10 be moved into the vacuum chamber 20 after the composite body 10 is put into an auxiliary vacuum tank (not shown).

Figure 7:
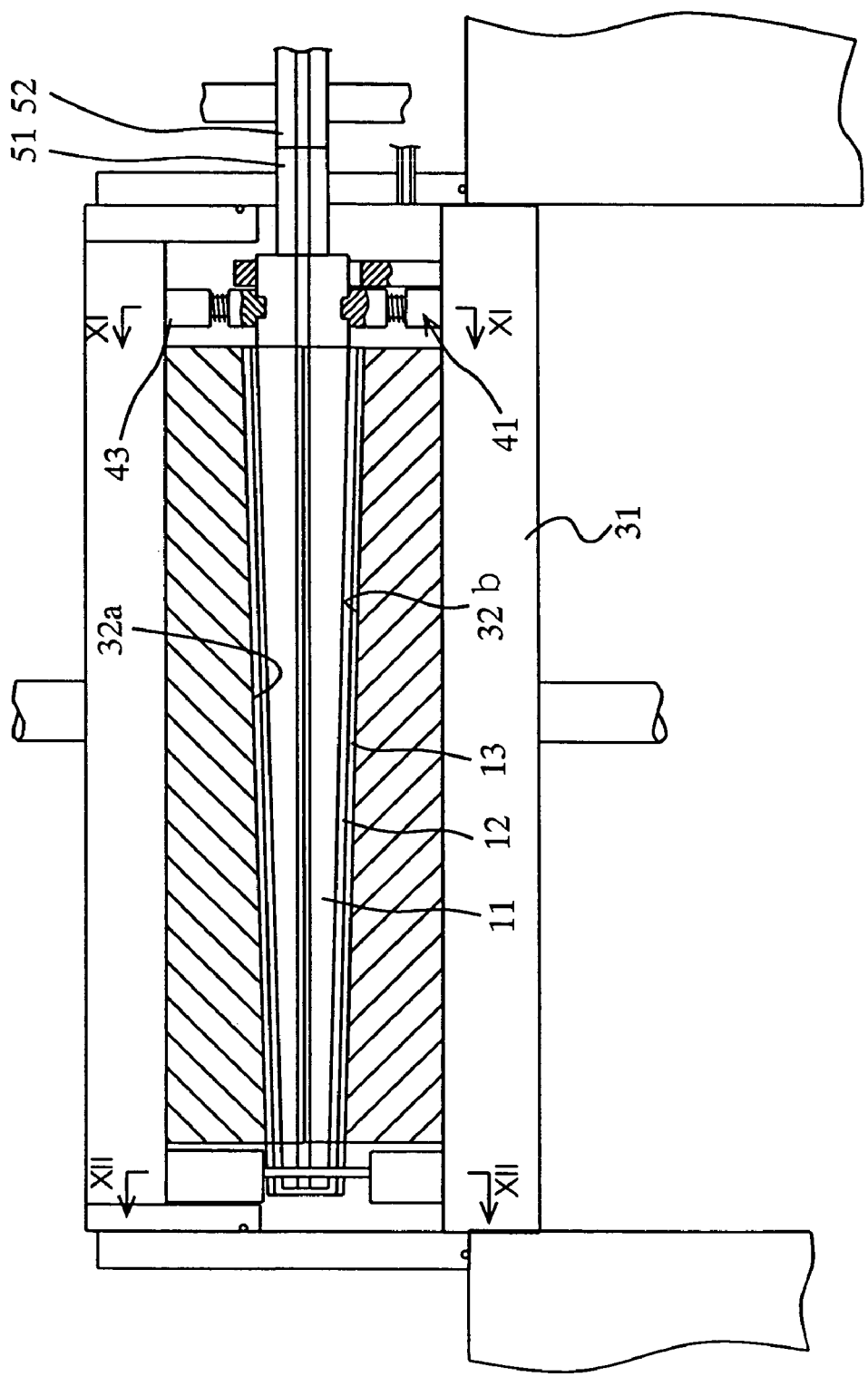
FIG. 7 is a view similar to that of FIG. 5A, showing another forming process different from the forming process shown in FIGS. 3 and 5A and the forming process shown in FIG. 6.

Immediately after the amount of vacuum in the vacuum chamber 20 exceeds a predetermined level (e.g., 0.01 kg/cm$^2$; a pressure of approximately 800 pascals), the lower-die platform 31 (the lower die 30b) is raised to close the shaft forming die 30. This upward movement of the lower-die platform 31 causes the mandrel support device 40 (which consists of the cantilever support base 41 and the anti-deflection support base 42) on the lower-die platform 31 to move upward together with the lower-die platform 31, and causes the front support portion 41b of the cantilever support base 41 to move downward slightly with respect to the lower-die platform 31 while compressing the compression coil springs 41f, and at the same time causes the anti-deflection support base 43 to move upward slightly while compressing the compression coil springs 43b so that the mandrel 11 (the composite body 10) is held between the cantilever support base 41 and the anti-deflection support base 43 without moving in the axial direction of the mandrel 11 (the composite body 10). In this state, the prepreg 13 of the composite body 10 is in contact with inner surfaces of the upper die 30a and the lower die 30b in the pair of shaping recesses 32a and 32b. At this time, substantially no air exits between the prepreg 13 and the pair of shaping recesses 32a and 32b (see FIG. 7) since the air in the vacuum chamber 20 has been sufficiently vacuumed by this time.

On completion of the clamping operation of the shaft forming die 30, the movable plate 52c is moved toward the movable case 20 to insert the tip end of the forced valve-opening nozzle 52 into the intermediate movable nozzle 51 to thereby open the check valve 51e via the pressing portion 52a. Subsequently, the movable plate 52c is further moved toward the movable case 20 to further insert the tip end of the forced valve-opening nozzle 52 into the intermediate movable nozzle 51 to insert the insertion portion 51a of the intermediate movable nozzle 51 into the axial air passage 11a of the mandrel 11 (see FIGS. 7 and 10). This operation does not make the composite body 10 move in the axial direction thereof because the composite body 10 is prevented from moving in the axial direction thereof by the engagement of the engaging projection 41a' with the axial-movement prevention groove 11c and the engagement of the engaging projection 43d with the axial-movement prevention groove 11c. In this state, applying pressure to the inside of the internal-pressure holding tube 12 through the axial air passage 11a and the plurality of radial air passages 11b by the internal-pressure supplying system 53 to increase the internal pressure in the internal-pressure holding tube 12 causes the prepreg 13 to come into intimate contact with inner surfaces of the upper die 30a and the lower die 30b in the pair of shaping recesses 32a and 32b. Since the shaft forming die 30 has been heated to a predetermined temperature by the shaft forming die heating system 34 at this stage, the prepreg 13 is shaped to correspond to the shape of the pair of shaping recesses 32a and 32b by maintaining the temperature of the shaft forming die 30 at a predetermined degree for a predetermined period of time in a state where the shaft forming die 30 is closed.

Figure 8:
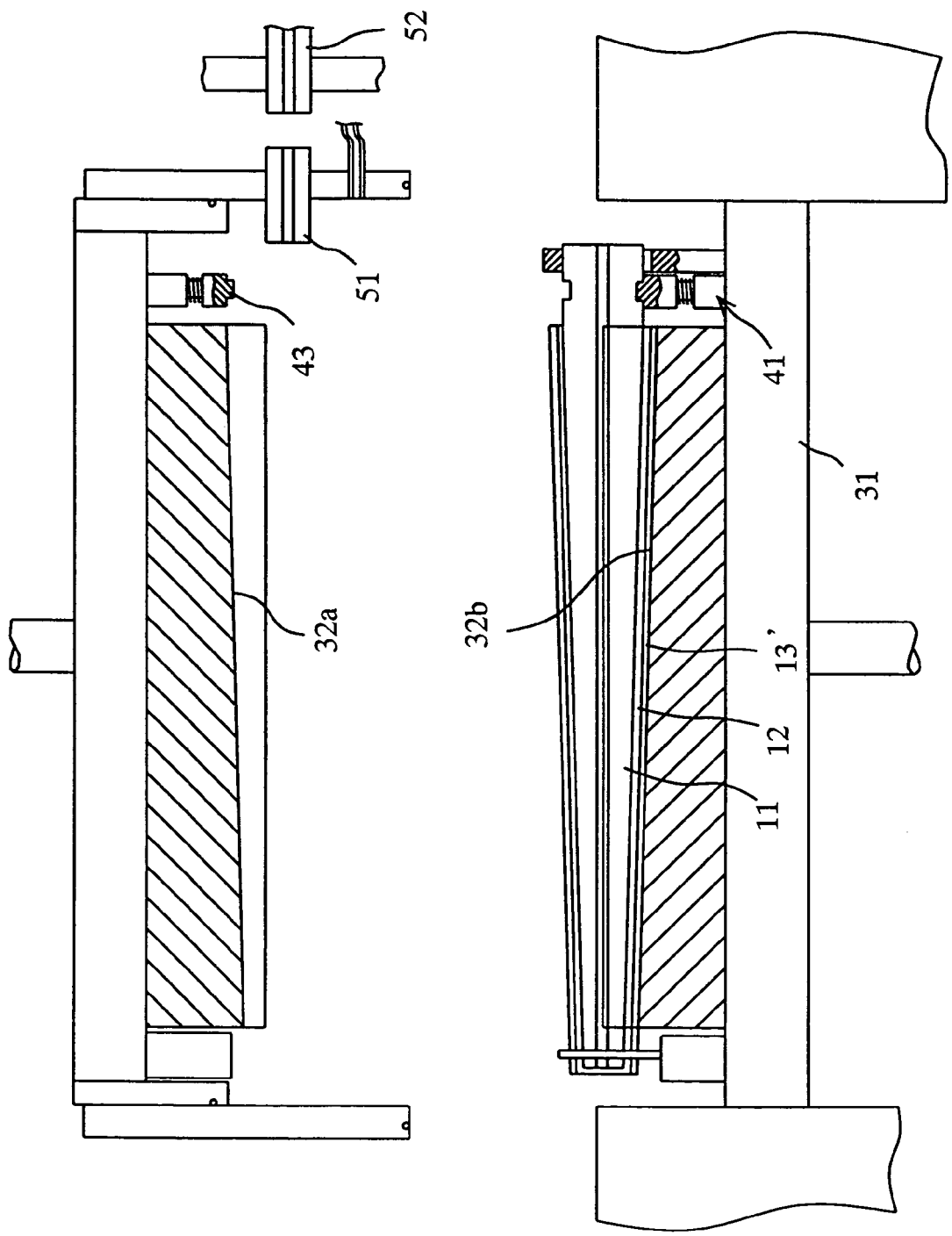
FIG. 8 is a view similar to that of FIG. 5A, showing yet another forming process different from the forming process shown in FIGS. 3 and 5A, the forming process shown in FIG. 6 and the forming process shown in FIG. 7.

After completion of the formation of the composite body 10, the valve-opening nozzle 52 is removed from the intermediate movable nozzle 51 to introduce the air to the inside of the vacuum chamber 20. Thereafter, the lower-die platform 31 is lowered to open the shaft forming die 30, and the movable case 20b is opened to remove a molded shaft 13' together with the mandrel 11 (see FIG. 8). Subsequently, the mandrel 11 and the internal-pressure holding tube 12 are removed in that order from the inside of the molded shaft 13'. It is possible to leave the internal-pressure holding tube 12 inside the molded shaft 13'. In this case, it is desirable that the internal-pressure holding tube 12 be made of a plastic film.

A manner of supporting the vacuum chamber 20 and the shaft forming die 30 has been discussed above by way of example. The vacuum chamber 20 can be an unopenable chamber as long as necessary operations can be carried out inside the vacuum chamber. The mandrel support. device 40 can be driven independently of the shaft forming die 30 (the upper die 30a and the lower die 30b). In addition, the upper holding block 43 can be fixedly mounted to an inner surface of the movable case 20b though provided to be movable with respect to an inner surface of the movable case 20b in the above illustrated embodiment of the mandrel support device 40.

Figure 13:
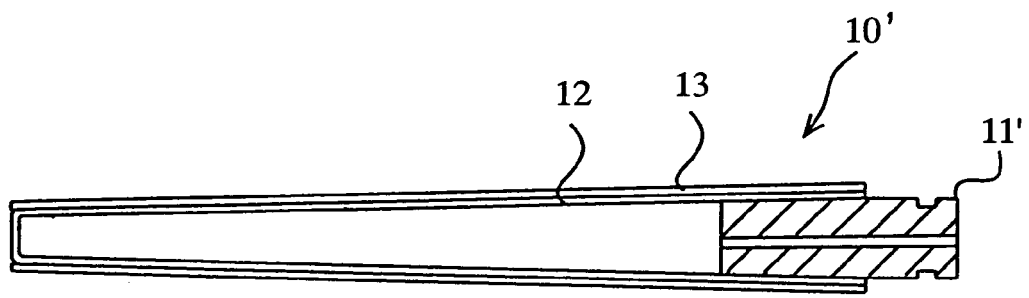
FIG. 13 is a schematic cross sectional view of a composite body, wherein a mandrel is removed from the composite body after the composite body is prepared using the mandrel, while an air-injecting mouth piece is fixed to an open end of the internal-pressure holding tube instead.

Although the composite body 10 is composed of the mandrel 11, the internal-pressure holding tube 12 and the prepreg 13 in the above described embodiment of the internal pressure forming apparatus, the internal-pressure holding tube 12 and the prepreg 13 are fundamental elements at the shaft forming operation. Namely, the mandrel 11 does not have to exist at the formation of the shaft 13'. FIG. 13 shows a composite body 10', wherein the mandrel 11 is removed from the composite body 10' after the prepreg 13 is wrapped around the internal-pressure holding tube 12, and an air-injecting mouth piece 11' is airtightly fixed to an open end of the internal-pressure holding tube 12 instead. In the case of using the composite body 10' shown in FIG. 13, a hollow FRP article can be formed by the same procedures as those described above with the above described embodiment of the internal pressure forming apparatus.

The present invention can be applied not only to a method and an apparatus for forming a hollow FRP golf club shaft by internal pressure molding such as those described above, but also to a method and an apparatus for forming any hollow FRP article such as a ski pole. In addition, the present invention can also be applied to a method and an apparatus for forming a non-linear hollow FRP article such as a hockey stick. Although the mandrel basically needs to have a shape corresponding to the shape of the associated forming die, the mandrel can be of a type having a length smaller than the length of a hollow article which is to be formed by the internal pressure forming apparatus according to the present invention. Namely, since the shape of the hollow article is determined by the shape of the forming die, the shape of the mandrel itself does not need to exactly correspond to the shape of the hollow article; for instance, the mandrel can be composed of a plurality of separate pieces. Alternatively, the mandrel can be made of metal having a high elasticity such as lead in the case of forming a non-linear hollow article so that the mandrel can be removed from the non-linear hollow article after the formation thereof, or the mandrel can be made of wax or a similar material which is melted when heated according to a method such as a lost wax process.

As can be understood from the foregoing, according to the present invention, a hollow FRP article with a satisfactory surface irregularity is achieved by internal pressure molding with which vacuum forming is merged.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A method for forming a hollow FRP article by internal pressure molding, comprising:
    positioning a FRP prepreg on a periphery of an airtight internal-pressure holding tube;
    inserting a composite body including said internal-pressure holding tube and said prepreg into a vacuum chamber containing a forming die and a composite body support device, said composite body support device having an anti-deflection support base and a cantilever support base provided with a front support portion and a rear support portion;
    positioning said composite body on said composite body support device such that said composite body is supported in cantilever fashion by said cantilever support base and is prevented from developing deflections by said anti-deflection support base;
    evacuating said vacuum chamber in an isolation state where said composite body and said forming die do not contact each other, so that air having existed in a space between an outer periphery of said composite body and a periphery of said forming die is removed; and
    clamping said forming die to bring said forming die and said composite body into contact with each other and heating said forming die with an application of pressure to an inside of said internal-pressure holding tube after completion of said evacuating step, while maintaining said evacuation state, where air having existed in a space between said outer periphery of said composite body and said periphery of said forming die has been removed.

2. The FRP hollow article forming method according to claim 1, wherein said prepreg positioning step comprises:
    covering a mandrel with said internal pressure holding tube; and
    wrapping said FRP prepreg around said periphery of said internal-pressure holding tube.

3. The FRP hollow article forming method according to claim 2, wherein said clamping and heating step comprises applying pressure to said inside of said internal-pressure holding tube through air passages formed on said mandrel.

4. The FRP hollow article forming method according to claim 1, wherein said prepreg positioning step comprises:
    covering a mandrel with said internal-pressure holding tube;
    wrapping said FRP prepreg around said periphery of said internal-pressure holding tube; and
    removing said mandrel after said wrapping step.

5. The FRP hollow article forming method according to claim 4, wherein said clamping and heating step comprises applying pressure to said inside of said internal-pressure holding tube through an air-injecting mouth piece fixed to an open end of said internal-pressure holding tube after said mandrel is removed.

* * * * *